No. 889,395. PATENTED JUNE 2, 1908.
LA VERNE W. NOYES.
TOWER.
APPLICATION FILED JULY 13, 1905.

3 SHEETS—SHEET 1

Witnesses:

Inventor:
La Verne W. Noyes
By Jones & Addington
Attys

THE NORRIS PETERS CO., WASHINGTON, D. C.

No. 889,395. PATENTED JUNE 2, 1908.
LA VERNE W. NOYES.
TOWER.
APPLICATION FILED JULY 13, 1905.
3 SHEETS—SHEET 2.
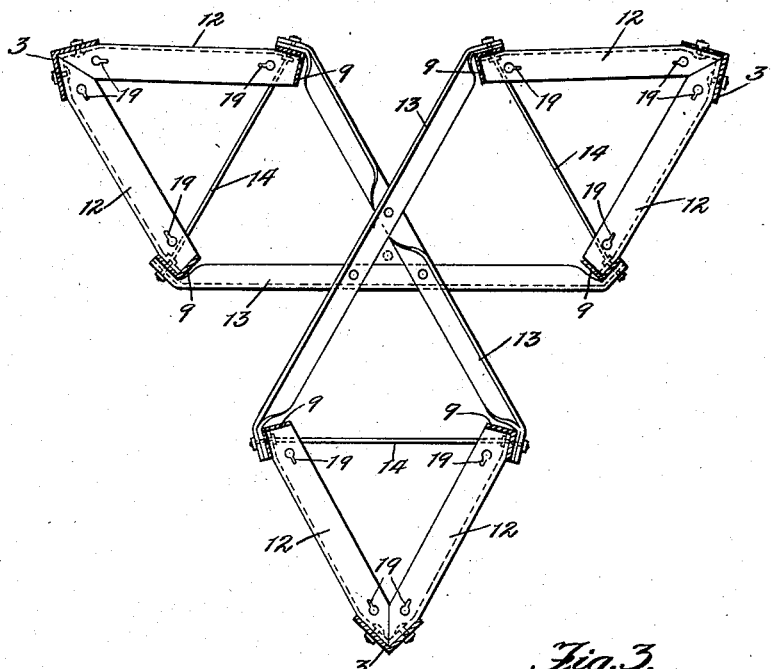
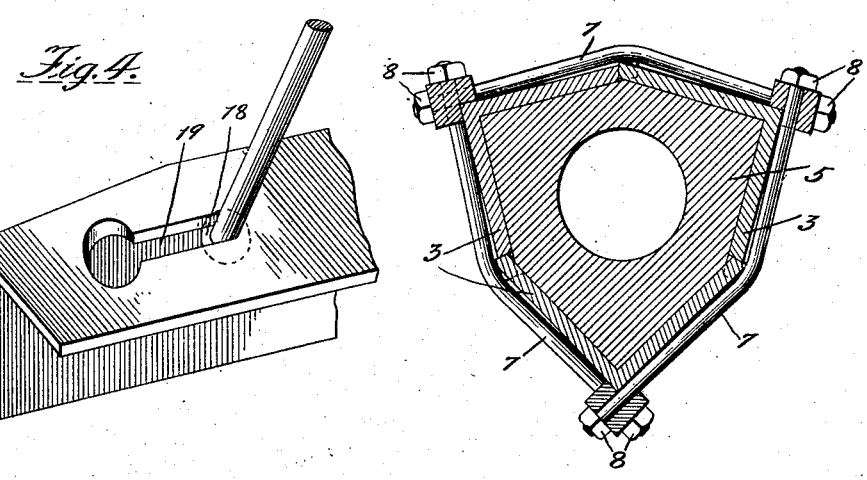
Witnesses:
Inventor:
La Verne W. Noyes
By Jones & Addington
Attys.
THE NORRIS PETERS CO., WASHINGTON, D. C.

No. 889,395. PATENTED JUNE 2, 1908.
LA VERNE W. NOYES.
TOWER.
APPLICATION FILED JULY 13, 1905.

3 SHEETS—SHEET 3.

Witnesses:

Inventor:
La Verne W. Noyes
By Jones & Addington
Attys

UNITED STATES PATENT OFFICE.

LA VERNE W. NOYES, OF CHICAGO, ILLINOIS.

TOWER.

No. 889,395.　　　　Specification of Letters Patent.　　　Patented June 2, 1908.

Application filed July 13, 1905. Serial No. 269,554.

*To all whom it may concern:*

Be it known that I, LA VERNE W. NOYES, a citizen of the United States, residing at Chicago, in the county of Cook and State of Illinois, have invented new and useful Improvements in Towers, of which the following is a full, clear, concise, and exact description, reference being had to the accompanying drawing, forming a part of this specification.
My invention relates to built up towers of structural iron, the object of my invention being to provide a tower of this character which will be strong and stable, and which will effectively withstand the strains to which such a tower is subjected.

A further object of my invention is to construct a tower whereby the same will occupy minimum ground space, and in which the bracing portions will be so arranged that ample space will be allowed beneath the same to permit persons or animals to pass beneath the tower without interference.

In accordance with my invention I provide a skeleton tower formed from structural iron which possesses unusual strength and stability due to its manner of construction.

One of the features of this tower which renders the same particularly advantageous is the provision of the downwardly extending supporting legs which are formed from a plurality of converging members suitably braced.

Figure 1:
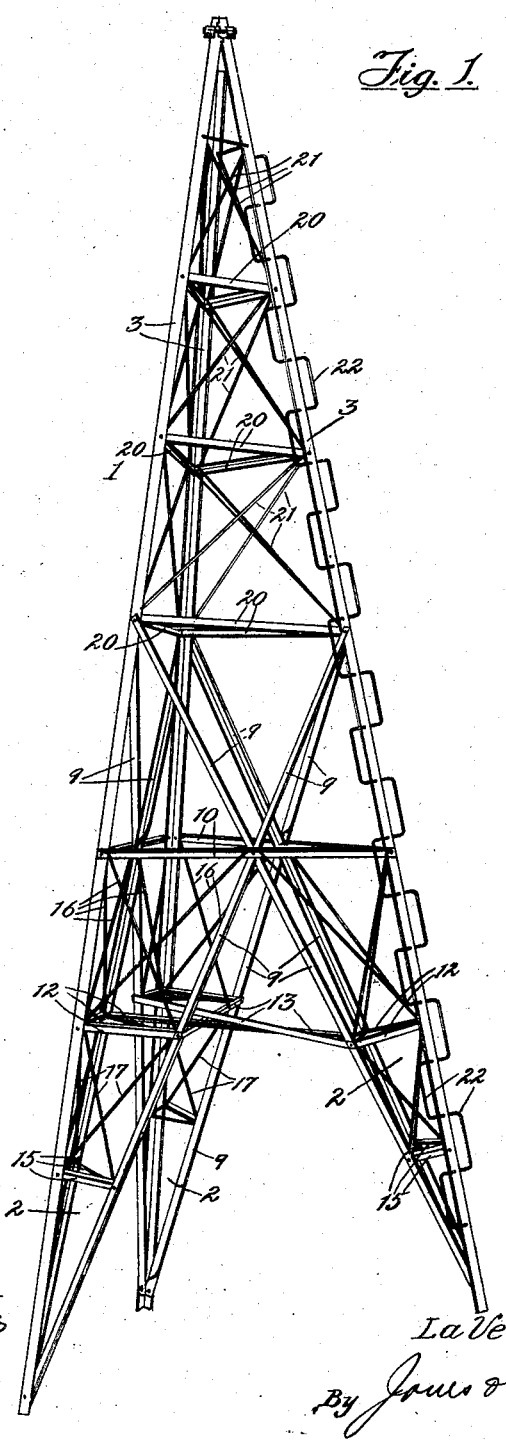
Figure 7:
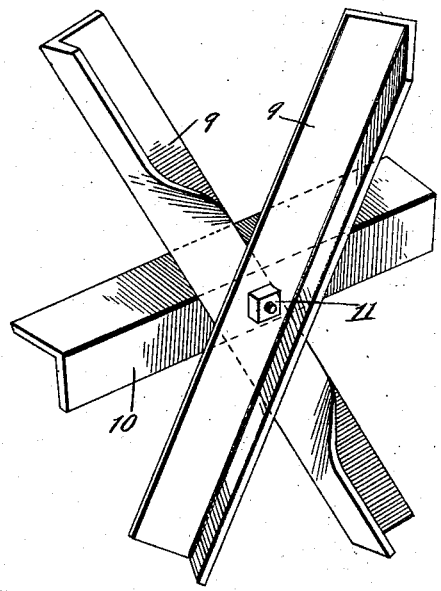
Figure 5:
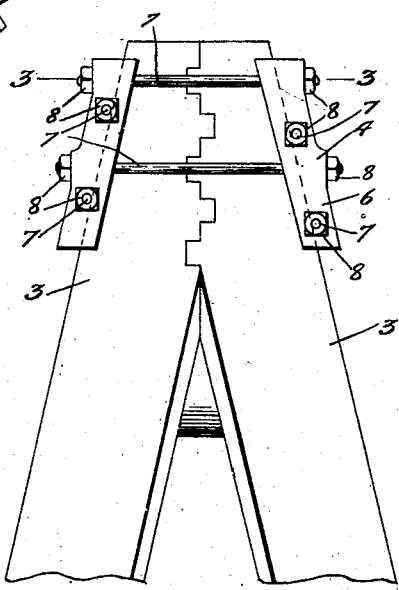
Figure 6:
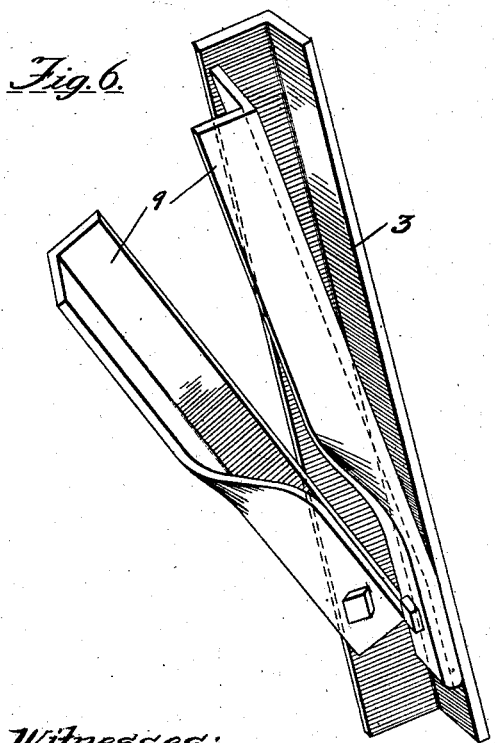

Another feature of the tower is the provision of a pyramidal upwardly extending arm. This arm may be formed in a variety of ways, but is preferably formed by a continuation of portions of the downwardly extending legs, whereby a tower of maximum strength is secured.
I have illustrated my invention in the accompanying drawings, in which:

Figure 1 is a perspective view of my invention; Fig. 2 is a plan view of my means for laterally bracing the three posts of each leg;
Fig. 3 is a sectional view on the line 3—3 of Fig. 5; Fig. 4 is a detail view of my means for connecting the bracing rods to the cross braces; Fig. 5 is a detail view of the top of my tower; Fig. 6 is a detail view of the bottom of one of the legs of my tower; and, Fig. 7 is a detail view showing the manner in which the posts of the legs of the tower cross.

As illustrated in the drawings, the particular skeleton tower which I have illustrated for the purpose of describing my invention, consists of an upright pyramidal arm 1, comprising three converging posts, suitably braced, and three downwardly extending legs, 2, each leg consisting of three converging posts. The tower thus has three equidistant legs affording a stable support and foundation. Moreover, each of these legs is constructed so that any tendency of the tower to sway or twist is resisted. The upright arm consists of three converging posts, affording a rigid and unyielding structure which effectively carries the weight of a wind wheel or other device, which may be imposed thereon, and effectively resists tendencies to sway or twist under the strains to which the post is subjected.

Analyzing the structure of the tower, it will be noted that the upwardly extending arm is pyramidal in shape, and is formed of three converging posts 3, the lower ends of these posts forming the ends of the legs, and the upper ends being mechanically united in any suitable manner. I preferably unite these ends as illustrated particularly in Figs. 3 and 5, wherein the angle bars comprising the posts 3 are shown as having their opposed flanges dove tailed to securely fit together, the same being bound by means of a clamp 4. Within the socket formed by the converging ends of the posts 3, is preferably arranged a block 5 which maintains the posts in their proper position at their ends, and also forms a bearing or support for the wind wheel rod or other means which may be mounted thereon. The clamp 4 preferably comprises angle pieces, as 6, which are adapted to fit over the angles of the posts as shown, and have formed therein openings through which pass the ends of the tie bars 7. These tie bars are fastened in position by means of the nuts 8, and serve to securely bind the upper ends of the converging posts 3 together. These converging posts 3 are preferably formed from angle bars, as illustrated. Extending from a point slightly above the middle of each of the posts 3, are a pair of bracing posts 9, each extending to the bottom of one of the opposite posts 3. These bracing posts are preferably secured together and secured to lateral braces 10 by means of a bolt 11 which passes through the same and the braces at their point of intersection. The posts 9 are braced to the upright posts 3, and to each other by means of lateral bars 12, which extend from the bracing posts 9 to the posts 3, and by lateral bars 13 which extend from the bracing posts of one leg to the bracing posts of the opposite legs, and are suitably bolted together at their points of intersection, as is shown particularly in Fig. 2. Tie rods 14 also extend between the two bracing posts 9 of each leg, and these posts are also laterally braced by bracing bars 15 which are located near the lower end of the legs. Tie rods 16 extend between the lateral braces 10, and the braces 12, and tie rods 17 extend between the braces 12 and the lateral bars 15 to securely tie the members of the structure together. The lateral members 10, 12, and 15, are preferably angle bars, and the tie rods are preferably secured thereto, as indicated in Fig. 4, wherein the enlarged head 18 is shown as applied to a key hole slot 19 in the bar. This form of connection permits the tie rods to be readily placed in position, thus materially reducing the cost of erection. Transverse bars 20 extend between the posts 3 of the upwardly extending pyramidal arm, and these are secured together by means of tie rods 21. The posts and bracing bars are preferably made of angle iron, and the posts are disposed, wherever possible, so that the same will rest in flat contact without the necessity of cutting away the flanges, and where it is impossible to so arrange the posts, instead of the flanges being cut away and thus weakening the same, they are turned down flat. The ends of the longer posts or bars are preferably formed of double thickness by flattening the flanges so that they will rest in parallel positions as illustrated in Fig. 6 in connection with the posts 9. One of the posts 3 may be provided with ladders 22, to permit the ready ascent of the tower. This, however, is optional, and ladders may or may not be provided as desired.

It will be noted that the skeleton tower which I have illustrated, comprises an upwardly extending pyramidal arm, and three downwardly extending pyramidal legs. These legs, as illustrated, diverge, while the longitudinal members of each leg converge toward the lower ends. It is apparent that the pyramidal construction of my invention may be employed in connection with a base or supporting portion of any desired form, and it is also apparent that the base or supporting portion comprises a plurality of downwardly extending legs which may be used in connection with a superstructure other than the single pyramidal arm arrangement. The claims hereinafter appended are drawn with respect to the several independent features of the invention.

While the device is particularly designed for use in connection with wind wheels, there are numerous other places in which the same may be used to advantage, as for instance, the carrying of electric wires, etc., and it will be understood that while I have described my invention in connection with one form of tower which I have worked out for commercial purposes, the same is susceptible of numerous changes and modifications in matters of structural detail, and I do not wish to limit myself to any features of detail except as set forth in the appended claims.

Having thus described my invention what I claim as new and desire to secure by Letters Patent is:

1. A tower having an upwardly extending three-post supporting arm, and three downwardly extending three post legs.

2. A tower having supporting legs, and interconnected bracing bars secured thereto, said bars intersecting each other at the points of interconnection.

3. A tower having three supporting legs provided with a plurality of intersecting and interconnected bracing bars.

4. A tower having a plurality of three-post supporting legs provided with intersecting bracing bars, each of said bars connecting a post of one leg with a post of another leg.

5. A tower having a plurality of three-post supporting legs provided with bracing bars secured at their ends to two posts of each leg, and intersecting each other at intermediate points.

In witness whereof, I have hereunto subscribed my name in the presence of two witnesses.

LA VERNE W. NOYES.

Witnesses:
W. PERRY HAHN,
M. R. ROCHFORD.